(12) United States Patent
Tanaka et al.

(10) Patent No.: US 9,447,786 B2
(45) Date of Patent: Sep. 20, 2016

(54) COMPRESSOR WITH TRAILING AND LEADING EDGES OF OIL DISCHARGE PASSAGE DISPLACED BEHIND TRAILING AND LEADING EDGES OF OIL SUPPLY HOLE

(71) Applicant: DAIKIN INDUSTRIES, LTD., Osaka-shi, Osaka (JP)

(72) Inventors: Kouji Tanaka, Sakai (JP); Hiroshi Kitaura, Sakai (JP); Yasuhiro Murakami, Sakai (JP); Yuuta Okamura, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/779,798

(22) PCT Filed: Jan. 31, 2014

(86) PCT No.: PCT/JP2014/000528
§ 371 (c)(1),
(2) Date: Sep. 24, 2015

(87) PCT Pub. No.: WO2014/155923
PCT Pub. Date: Oct. 2, 2014

(65) Prior Publication Data
US 2016/0047381 A1 Feb. 18, 2016

(30) Foreign Application Priority Data

Mar. 29, 2013 (JP) ................. 2013-074085

(51) Int. Cl.
*F03C 2/00* (2006.01)
*F04C 2/00* (2006.01)
(Continued)

(52) U.S. Cl.
CPC .......... *F04C 29/023* (2013.01); *F01C 1/0215* (2013.01); *F01C 21/04* (2013.01); *F04B39/0246* (2013.01); *F04C 15/0088* (2013.01); *F04C 18/0215* (2013.01); *F04C 23/008* (2013.01); *F04C 29/0057* (2013.01); *F16N 7/366* (2013.01)

(58) Field of Classification Search
CPC ............ F04C 18/0215; F04C 15/0088; F04C 23/008; F04C 27/005; F04C 29/02; F04C 29/023; F04C 29/0057; F04C 2210/14; F04C 2240/60; F04C 2240/809; F04C 1/0215; F04C 21/04; F04B 39/0246; F04B 27/109
USPC ........................... 418/55.1–55.6, 57, 88, 94; 184/6.16–6.18; 415/88
See application file for complete search history.

(56) References Cited

U.S. PATENT DOCUMENTS 3,451,615 A 6/1969 Hover
4,236,879 A * 12/1980 Abe .................... F04B 39/0246
184/6.18

(Continued)

FOREIGN PATENT DOCUMENTS

JP 04121475 A * 4/1992 .............. F04C 29/02
JP 8-270562 A 10/1996
(Continued)

OTHER PUBLICATIONS

International Search Report of corresponding PCT Application No. PCT/JP2014/000528 dated Mar. 25, 2014.
(Continued)

*Primary Examiner* — Theresa Trieu
(74) *Attorney, Agent, or Firm* — Global IP Counselors

(57) ABSTRACT

A compressor includes a compression mechanism and a drive shaft having an oil supply hole opened through an outer peripheral surface of the drive shaft to supply oil to a bearing surface of the drive shaft. An oil discharge passage communicating with the oil supply hole is formed by a flat surface or a recessed surface at a portion of the outer peripheral surface of the drive shaft. A trailing edge of the oil discharge passage is displaced behind a trailing edge of the oil supply hole with respect to a rotation direction of the drive shaft. A leading edge of the oil discharge passage is displaced behind a leading edge of the oil supply hole with respect to the rotation direction of the drive shaft. The oil discharge passage has a width that is no larger than a diameter of the oil supply hole.

16 Claims, 6 Drawing Sheets

(51) Int. Cl.
 *F04C 18/00* (2006.01)
 *F04C 29/02* (2006.01)
 *F01C 21/04* (2006.01)
 *F01C 1/02* (2006.01)
 *F04C 15/00* (2006.01)
 *F04B 39/02* (2006.01)
 *F04C 23/00* (2006.01)
 *F04C 18/02* (2006.01)
 *F04C 29/00* (2006.01)
 *F16N 7/36* (2006.01)

(56) References Cited

U.S. PATENT DOCUMENTS 4,828,466 A * 5/1989 Kim .................. F04C 29/028
 184/6.16

2004/0241013 A1* 12/2004 Park .................. F04B 49/126
 417/313
2004/0247474 A1 12/2004 Kitaura et al.
2008/0145247 A1* 6/2008 Park .................. F04B 39/0022
 417/437

FOREIGN PATENT DOCUMENTS

| JP | 9-228971 A |   | 9/1997 |   |
|----|------------|---|--------|---|
| JP | 11-82349 A |   | 3/1999 |   |
| JP | 2001041162 A | * | 2/2001 | .............. F04C 29/02 |
| JP | 2004-11482 A |   | 1/2004 |   |
| JP | 2009-138582 A |   | 6/2009 |   |
| JP | 2009-243354 A |   | 10/2009 |   |
| JP | 2011-185156 A |   | 9/2011 |   |

OTHER PUBLICATIONS

International Preliminary Report of corresponding PCT Application No. PCT/JP2014/000528 dated Oct. 8, 2015.

* cited by examiner

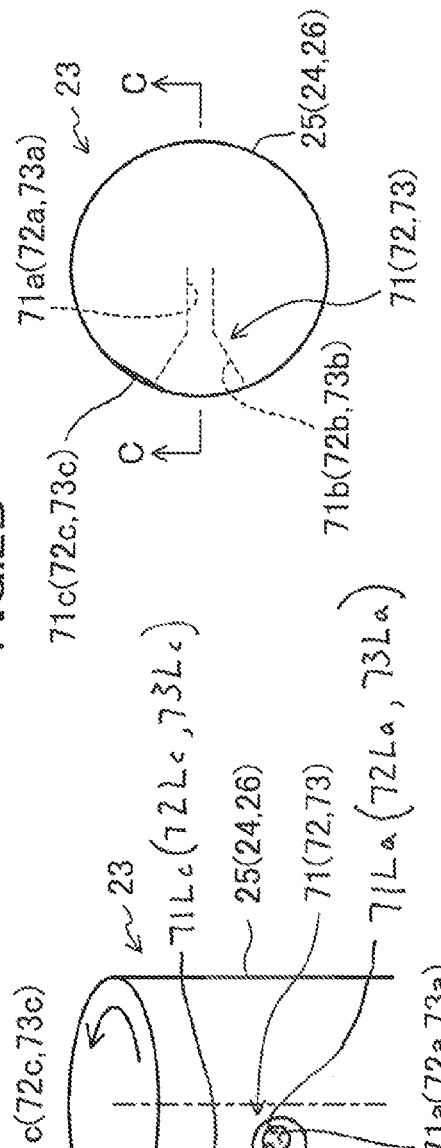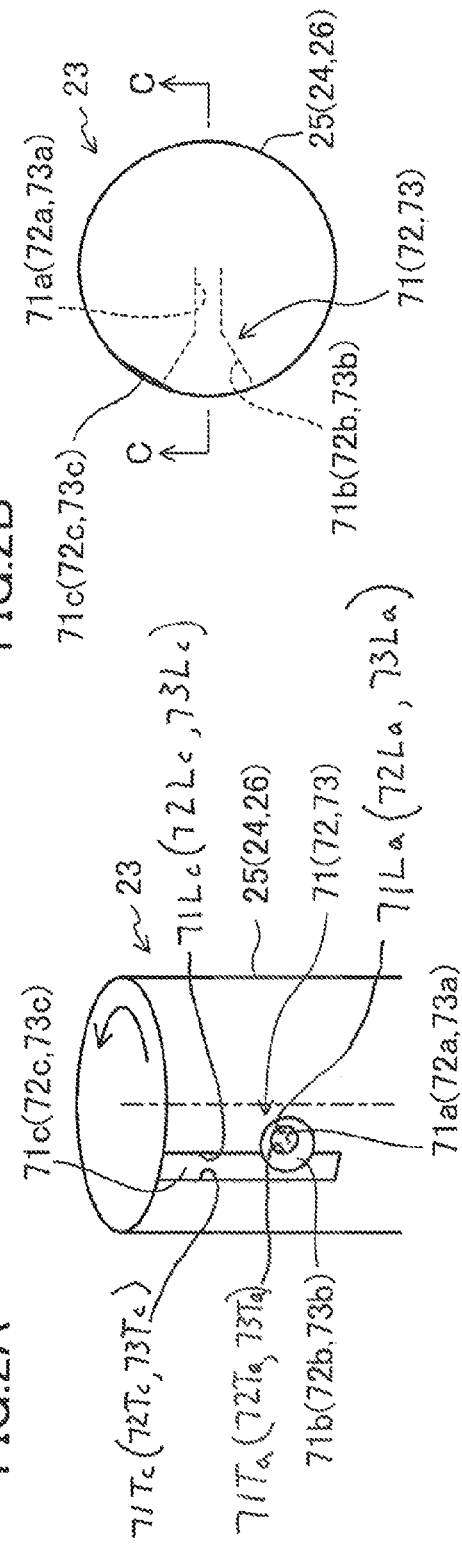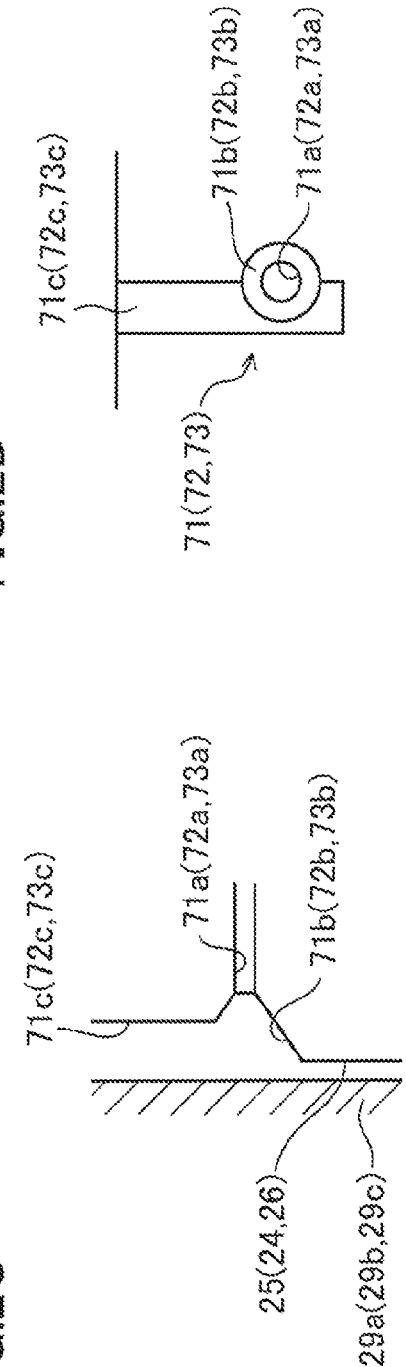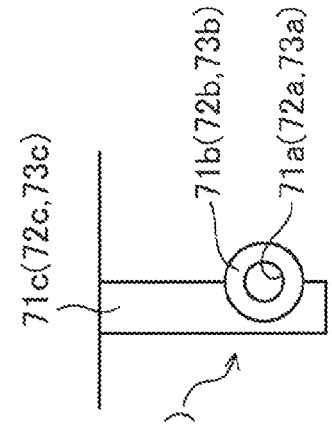

COMPRESSOR WITH TRAILING AND LEADING EDGES OF OIL DISCHARGE PASSAGE DISPLACED BEHIND TRAILING AND LEADING EDGES OF OIL SUPPLY HOLE

CROSS-REFERENCE TO RELATED APPLICATIONS

This U.S. National stage application claims priority under 35 U.S.C. §119(a) to Japanese Patent Application No. 2013-074085, filed in Japan on Mar. 29, 2013, the entire contents of which are hereby incorporated herein by reference.

TECHNICAL FIELD

The present invention relates to a compressor, and more particularly relates to a compressor including a compression mechanism and a drive shaft configured to drive the compression mechanism and having an oil supply hole which is opened through its outer peripheral surface to supply oil to its own bearing surface, and an oil discharge passage for discharging the oil.

BACKGROUND ART

A conventional compressor includes, in its casing, a compression mechanism and a drive shaft for driving the compression mechanism. The drive shaft has an oil supply hole which is opened through its outer peripheral surface to supply oil to its own bearing surface. An oil supply groove communicating with the oil supply hole is arranged on the outer peripheral surface of the drive shaft so as to extend along the shaft (see, e.g., Japanese Unexamined Patent Publication No. H9-228971). In the compressor of Japanese Unexamined Patent Publication No. H9-228971, the oil supply passage is formed inside the drive shaft and extends in the axial direction. The oil accumulated in an oil reservoir inside the casing is supplied from the oil supply passage to the bearing surface through the oil supply hole and the oil supply groove.

As illustrated in FIGS. 6A and 6B, in the compressor of Japanese Unexamined Patent Publication No. H9-228971, the oil supply passage (101) is formed through the middle of the drive shaft (100) and extends in the axial direction. The oil supply hole (102) connected to the oil supply passage (101) is formed to extend perpendicularly to the oil supply passage. An oil supply groove (103) is provided as a recessed groove on an outer peripheral surface of the drive shaft (100) and extends in the axial direction. This oil supply groove (103) also serves as an oil discharge passage for supplying oil to another bearing provided above the bearing (105) shown in the drawing.

SUMMARY

Technical Problem

Here, if the oil supply groove (103) which also serves as an oil discharge passage has an excessively broad width, the amount of oil supplied to a sliding portion of the bearing (105) increases. The oil supplied to the sliding portion of the bearing (105) is discharged out of the casing together with a working fluid (a refrigerant). However, if the amount of oil supplied to the sliding portion increases, the amount of oil discharged out of the casing also increases. Accordingly, the amount of oil in the casing easily decreases. To avoid such a situation, it is conceivable that the width of the oil discharge passage (103) is narrowed.

However, for example, if the width of the oil discharge passage (103) is made too much narrower than the oil supply hole (102) as illustrated in FIG. 6C, a foreign substance (106) such as a metal powder is accumulated in the oil supply hole (102), and might be hardly discharged from the oil discharge passage (103). Such a problem is likely to occur, for example, particularly when the foreign substance (106) formed in the sliding portion is larger than the clearance of the bearing surface (a tin gap between the outer peripheral surface of the drive shaft (100) and the inner peripheral surface of the bearing (105)). Then, if the foreign substance (106) is accumulated in the oil supply hole (102), then the oil supply hole (102) could be clogged up with the foreign substance (106). Alternatively, even if the foreign substance (106) could be discharged to the oil discharge passage (103) through the hole (102), most of the foreign substance (106) would pass through only an upper end of the oil supply hole (102). Consequently, the foreign substance could eat into the inner peripheral surface of the bearing (105), thus possibly causing some damage to the bearing (105).

In view of the forgoing, it is therefore an object of the present invention to reduce damage to be done to the bearing by preventing such a foreign substance from being accumulated in the oil supply hole of the drive shaft.

Solution to the Problem

A first aspect of the present invention is directed to a compressor including a compression mechanism (30) and a drive shaft (23) for driving the compression mechanism (30), wherein the drive shaft (23) has an oil supply hole (71a, 72a, 73a) which is opened through an outer peripheral surface of the drive shaft (23) to supply oil to a bearing surface of the drive shaft (23).

In this compressor, an oil discharge passage (71c, 72c, 73c) communicating with the oil supply hole (71a, 72a, 73a) is formed by a flat surface or a recessed surface at a portion of the outer peripheral surface of the drive shaft (23), a trailing edge (71Tc 72Tc, 73Tc) of the oil discharge passage (71c, 72c, 73c) is displaced behind a trailing edge (71Ta, 72Ta, 73Ta) of the oil supply hole (71a, 72a, 73a) with respect to a rotation direction of the drive shaft (23), and a leading edge (71Lc, 72Lc, 73Lc) of the oil discharge passage (71c, 72c, 73c) is displaced behind a leading edge (71La, 72La, 73La) of the oil supply hole (71a, 72a, 73a) with respect to a rotation direction of the drive shaft (23). The respective trailing edges of the oil discharge passage (71c, 72c, 73c) and the oil supply hole (71a, 72a, 73a) are both located with respect to the rotation direction of the drive shaft (23). The respective leading edges of the oil discharge passage (71c, 72c, 73c) and the oil supply hole (71a, 72a, 73a) are both located with respect to the rotation direction of the drive shaft (23).

According to the first aspect of the present invention, the oil discharge passage (71c, 72c, 73c) is arranged behind the oil supply hole (71a, 72a, 73a) with respect to the rotation direction of the drive shaft (23). Thus, even if a foreign substance such as a metal powder enters the oil supply hole (71a, 72a, 73a), the foreign substance moves to the oil discharge passage (71c, 72c, 73c), and is discharged out of a bearing surface from the oil discharge passage (71c, 72c, 73c). In this case, the foreign substance is discharged from the oil supply hole (71a, 72a, 73a) not only in the direction in which the foreign substance moves from the oil discharge passage (71c, 72c, 73c) in the axial direction of the drive shaft (23) but also in the direction in which the foreign substance is going to pass through the clearance between the bearing surfaces from the trailing edge of the oil discharge passage (71c, 72c, 73c) with respect to the rotation direction to.

A second aspect of the present invention is an embodiment of the first aspect of the present invention. In the second aspect, the oil discharge passage (71c, 72c, 73c) is formed to have a width less than or equal to a diameter of the oil supply hole (71a, 72a, 73a).

According to the second aspect of the present invention, a foreign substance is also discharged outside from the oil supply hole (71a, 72a, 73a) and the oil discharge passage (71c, 72c, 73c) as in the first aspect of the present invention.

A third aspect of the present invention is an embodiment of the first or second aspect of the present invention. In the third aspect, the oil discharge (71c, 72c, 73c) includes a first end portion located closer to the oil supply hole (71a, 72a, 73a) and a second end portion which is located opposite to the first end portion and from which oil is discharged. A line segment connecting the first and second end portions together is parallel to the axial direction of the drive shaft (23).

A fourth aspect of the present invention is an embodiment of the first or second aspect of the present invention. In the fourth aspect, the oil discharge passage (71c, 72c, 73c) includes a first end portion located closer to the oil supply hole (71a, 72a, 73a) and a second end portion which is located opposite to the first end portion and from which oil is discharged. The oil discharge passage (71c, 72c, 73c) is tilted with respect to the axial direction of the drive shaft (23) and the second end portion is located behind the first end portion with respect to the rotation direction of the drive shaft (23).

According to the third and fourth aspects of the present invention, oil in the oil supply hole (71a, 72a, 73a) is discharged from the bearing surface through the oil discharge passage (71c, 72c, 73c). A foreign substance such as a metal powder could enter the oil supply hole (71a, 72a, 73a) or the oil discharge passage (71c, 72c, 73c). According to these aspects of the present invention, however, the foreign substance is easily discharged from the oil discharge passage (71c, 72c, 73c).

A fifth aspect of the present invention is an embodiment of the third or fourth aspect of the present invention. In the fifth aspect, the first end portion of the oil discharge passage (71c, 72c, 73c), which is located closer to the oil supply hole (71a, 72a, 73a), extends beyond the oil supply hole (71a, 72a, 73a) in the opposite direction that goes away from the second end portion from which the oil is discharged.

According to the fifth aspect of the present invention, the trailing edge of the oil discharge passage (71c, 72c, 73c) with respect to the rotation direction comes to have an increased length. Accordingly, a foreign substance is discharged more easily from the trailing edge in such a direction as passing through the clearance between the bearing surfaces.

A sixth aspect of the present invention is an embodiment of any one of the first to fifth aspects of the present invention. In the sixth aspect, the drive shaft (23) is provided with a chamfered portion (71b, 72b, 73b) gradually expanding from an opening edge of the oil supply hole (71a, 72a, 73a).

According to the sixth aspect of the present invention, such a chamfered portion (71b, 72b, 73b) is provided for the opening edge of the oil supply hole (71a, 72a, 73a). Accordingly, a foreign substance is hardly accumulated in the oil supply hole (71a, 72a, 73a).

A seventh aspect of the present invention is an embodiment of the sixth aspect of the present invention. In the seventh aspect, the trailing edge of the discharge passage (71c, 72c, 73c) is displaced behind a trailing edge of the chamfered portion (71b, 72b, 73b) with respect to the rotation direction of the drive shaft (23). The respective edges of the oil discharge passage (71c, 72c, 73c) and the chamfered portion (71b, 72b, 73b) are both located with respect to the rotation direction of the drive shaft (23).

According to the seventh aspect of the present invention, even if a foreign substance such as a metal powder enters the oil supply hole (71a, 72a, 73a), the foreign substance is easily discharged from the chamfered portion (71b, 72b, 73b) through the oil discharge passage (71c, 72c, 73c).

An eighth aspect of the present invention is an embodiment of any one of the first to seventh aspects of the present invention. In the eighth aspect, the drive shaft (23) is a shaft extending vertically. The drive shaft (23) includes: a main shaft portion (24) located in the middle of the drive shaft (23); an eccentric portion (25) located over the main shaft portion (24), coupled to the compression mechanism (30), and having a smaller diameter than the main shaft portion (24); and a lower main shaft portion (26) located under the main shaft portion (24). The oil supply hole (71a, 72a, 73a) includes a first oil supply hole (71a) formed in the eccentric portion (25). The oil discharge passage (71c, 72c, 73c) includes a first oil discharge passage (71c) extending upward from the first oil supply hole (71a) and having an open end portion.

A ninth aspect of the present invention is an embodiment of any one of the first to seventh aspects of the present invention. In the ninth aspect, the drive shaft (23) is a shaft extending vertically. The drive shaft (23) includes: a main shaft portion (24) located in the middle of the drive shaft (23); an eccentric portion (25) located over the main shaft portion (24), coupled to the compression mechanism (30), and having a smaller diameter than that of the main shaft portion (24); and a lower main shaft portion (26) located under the main shaft portion (24). The oil supply hole (71a, 72a, 73a) includes a second oil supply hole (72a) formed in the main shaft portion (24). The oil discharge passage (71c, 72c, 73c) includes a second oil discharge passage (72c) extending upward from the second oil supply hole (72a) and having an open end portion.

A tenth aspect of the present invention is an embodiment of any one of the first to seventh aspects of the present invention. In the tenth aspect, the drive shaft (23) is a shaft extending vertically. The drive shaft (23) includes: a main shaft portion (24) located in the middle of the drive shaft (23); an eccentric portion (25) located over the main shaft portion (24), coupled to the compression mechanism (30), and having a smaller diameter than the main shaft portion (24); and a lower main shaft portion (26) located under the main shaft portion (24). The oil supply hole (71a, 72a, 73a) includes a third oil supply hole (73a) formed in the lower main shaft portion (26). The oil discharge passage (71c, 72c, 73c) includes a third oil discharge passage (73c) extending downward from the third oil supply hole (73a) and having an open end portion.

According to the eighth to tenth aspects of the present invention, in each of the eccentric portion (25), main shaft portion (24), and lower main shaft portion (26) of the drive shaft (23), oil is discharged more easily from the oil supply hole (71a, 72a, 73a) through the oil discharge passage (71c, 72c, 73c). Accordingly, even if a foreign substance such as a metal powder enters the oil supply hole (71a, 72a, 73a), the foreign substance is easily discharged.

In the ninth and tenth aspects of the present invention, the first oil supply hole (71a) of the eccentric portion (25) may be omitted.

Advantages of the Invention

According to the first and second aspects of the present invention, the oil discharge passage (71c, 72c, 73c) is arranged behind the oil supply hole (71a, 72a, 73a) with respect to the rotation direction of the drive shaft (23). Accordingly, even if a foreign substance such as a metal powder enters the oil supply hole (71a, 72a, 73a), the foreign substance is discharged out of the bearing surface from the oil discharge passage (71c, 72c, 73c). Consequently, the foreign substance is hardly accumulated in the oil supply hole (71a, 72a, 73a), and thus damage to be done to the bearing is reduced.

According to the third and fourth aspects of the present invention, even if a foreign substance such as a metal powder enters the oil discharge passage (71c, 72c, 73c), the foreign substance is easily discharged and prevented from being left on the bearing surface. In particular, according to the fourth aspect of the present invention, the oil discharge passage (71c, 72c, 73c) is tilted so that the foreign substance is hardly left. As a result, the damage to be done to the bearing surface is more reliably reduced.

According to the fifth aspect of the present invention, the trailing edge of the oil discharge passage (71c, 72c, 73c) with respect to the rotation direction has its length increased so much that the foreign substance is easily discharged from the trailing edge through the clearance between the bearing surfaces. Consequently, the damage to be done to the bearing surface is more reliably reduced.

According to the sixth aspect of the present invention, the chamfered portion (71b, 72b, 73b) is provided for the opening edge of the oil supply hole (71a, 72a, 73a) so that a foreign substance is hardly accumulated in the oil supply hole (71a, 72a, 73a). Accordingly, the damage to be done to the bearing is more reliably reduced.

According to the seventh aspect of the present invention, even if a foreign substance such as a metal powder enters the oil supply hole (71a, 72a, 73a), the foreign substance is easily discharged from the chamfered portion (71b, 72b, 73b) through the oil discharge passage (71c, 72c, 73c). Accordingly, the damage to be done to the bearing is more reliably reduced.

According to the eighth to tenth aspects of the present invention, in each of the eccentric portion (25), main shaft portion (24), and lower main shaft portion (26) of the drive shaft (23), a foreign substance and other substances are easily discharged together with oil. Accordingly, the damage to be done to the bearing by the foreign substance is reduced.

BRIEF DESCRIPTION OF THE DRAWINGS

FIG. 2A is an enlarged perspective view of an eccentric portion. FIG. 2B is a plan view of the eccentric portion. FIG. 2C is a cross-sectional view taken along the plane C-C in FIG. 2B. FIG. 2D is an enlarged view of an upper end portion of the eccentric portion.

DESCRIPTION OF EMBODIMENTS

Embodiments of the present invention will be described in detail with reference to the drawings.

The following are embodiments of the present invention.

Figure 1:
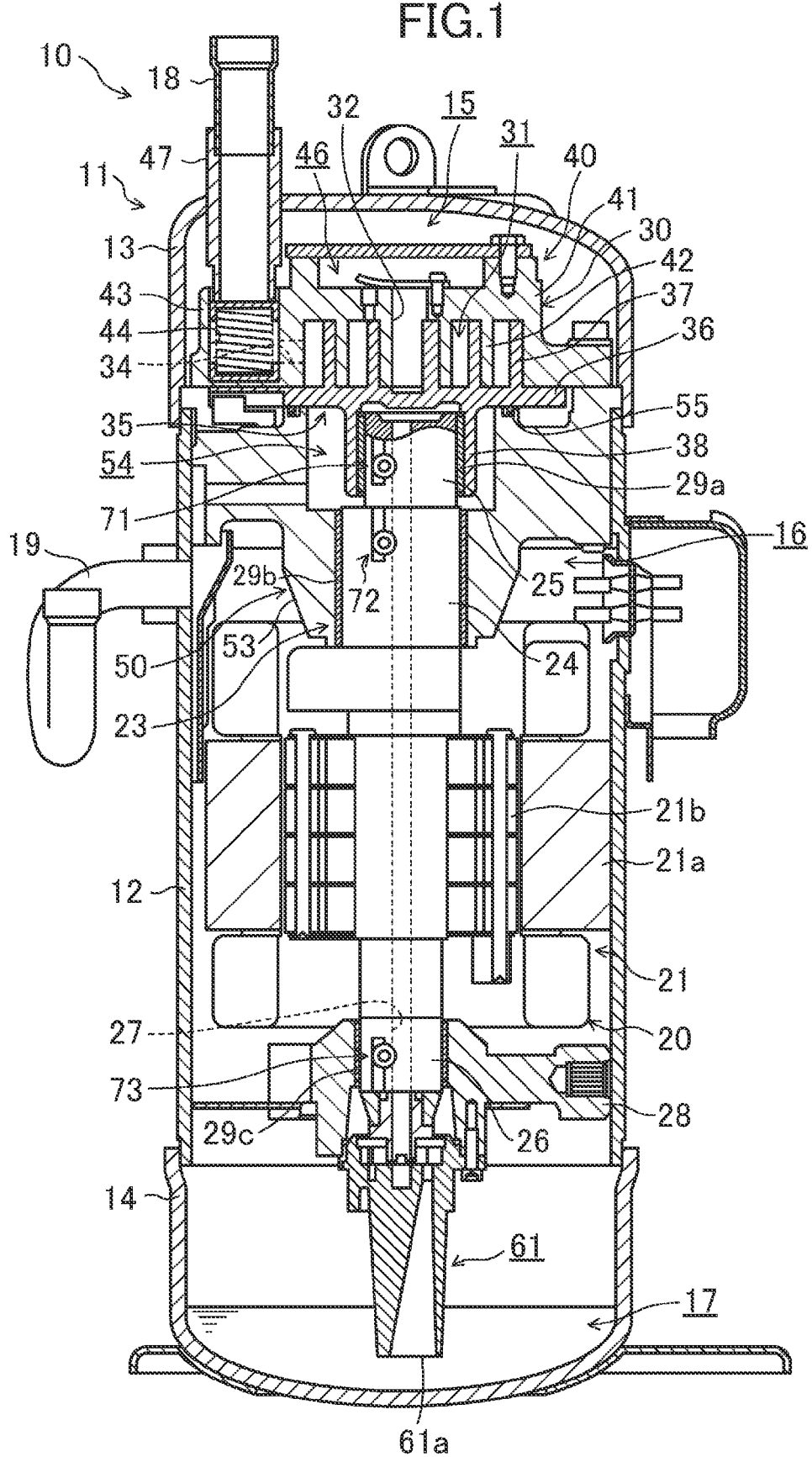
FIG. 1 is a longitudinal sectional view of a scroll compressor according to an embodiment.

FIG. 1 is a longitudinal sectional view illustrating a configuration of a scroll compressor according to an embodiment of the present invention. The scroll compressor (10) may be connected to a refrigerant circuit inch performs a refrigeration cycle of a vapor compression type in an air conditioning system, for example. The scroll compressor (10) includes a casing (11), a rotary compression mechanism (30), and a drive mechanism (20) for driving the compression mechanism (30) in rotation.

The casing (11) is configured as a vertically elongated cylindrical sealed container with closed ends, and includes a cylindrical body (12), an upper end plate (13) fixed to the upper end of the body (12), and a lower end plate (14) fixed to the lower end of the body (12).

The inside of the casing (11) is divided into upper and lower spaces by a housing (50) joined to the inner peripheral surface of the casing (11). The space over the housing (50) constitutes an upper space (15), and the space under the housing (50) constitutes a lower space (16). The configuration of this housing (50) will be described in detail later.

An oil reservoir portion (17) configured to store lubricating oil for lubricating a sliding part of the scroll compressor (10) is provided at the bottom of the lower space (16) in the casing (11).

The casing (11) is provided with a suction pipe (18) and a discharge pipe (19). One end of the suction pipe (18) is connected to a suction pipe fitting (47). The discharge pipe (19) runs through the body (12). An end of the discharge pipe (19) is opened in the lower space (16) of the casing (11).

The drive mechanism (20) includes a motor (21) and a drive shaft (23). The motor (21) is housed in the lower space (16) of the casing (11). The motor (21) includes a cylindrical stator (21a) and a cylindrical rotor (21b). The stator (21a) is fixed to the body (12) of the casing (11). The rotor (21b) is disposed in a hollow portion of the stator (21a). In a hollow portion of the rotor (21b), the drive shaft (23) is fixed to run through the rotor (21b) such that the rotor (21b) and the drive shaft (23) rotate together.

The drive shaft (23) includes a main shaft portion (24) extending vertically and an eccentric portion (25) located over the main shaft portion (24). The main shaft portion (24) and the eccentric portion (25) form integral parts of the drive shaft (23). The eccentric portion (25) has a diameter smaller than the maximum diameter of the main shaft portion (24). The shaft center of the eccentric portion (25) is eccentric to the shaft center of the main shaft portion (24) by a predetermined distance. The lower end (a lower main shaft portion (26)) of the main shaft portion (24) in the drive shaft (23) is rotatably supported by a lower bearing part (28) fixed to a portion of the casing (11) near the lower end of the body (12). The upper end of the main shaft portion (24) is rotatably supported by a bearing part (53) of the housing (50). Inside the drive shaft (23), formed is an oil supply passage (27) extending in the axial direction.

At the lower end of the drive shaft (23), provided is a suction nozzle (61) which serves as a suction member for sucking oil. The suction nozzle (61) functions as a positive displacement pump. An inlet (61a) of the suction nozzle (61) is opened in the oil reservoir portion (17) of the casing (11). An outlet of the suction nozzle (61) is connected to the oil supply passage (27) of the drive shaft (23) so as to communicate with the passage (27). The oil sucked from the oil reservoir portion (17) by the suction nozzle (61) flows through the oil supply passage (27) and is supplied to a sliding portion of the scroll compressor (10).

The compression mechanism (30) is a so-called "scroll type" compression mechanism including an orbiting scroll (35), a fixed scroll (40), and a housing (50). The housing (50) and the fixed scroll (40) are bolted together, and the orbiting scroll (35) is housed between them (50, 40).

The orbiting scroll (35) includes a substantially disk-shaped movable end plate (36). A movable lap (37) stands on the upper surface of the movable end plate (36). The movable lap (37) is a spiral-shaped wall extending radially outward from a position near the center of the movable end plate (36). A boss (a bearing part) (38) projects from the lower surface of the movable end plate (36).

The fixed scroll (40) includes a substantially disk-shaped fixed end plate (41). A fixed lap (42) stands on the lower surface of the fixed end plate (41). The fixed lap (42) is a spiral-shaped wall extending radially outward from a position near the center of the fixed end plate (41), and is engaged with the movable lap (37) of the orbiting scroll (35). A compression chamber (31) is formed between the fixed lap (42) and the movable lap (37).

The fixed scroll (40) includes an outer edge (43) continuously extending radially outward from the outermost wall of the fixed lap (42). The lower end surface of the outer edge (43) is fixed to the upper end surface of the housing (50). The outer edge (43) has an opening (44) that is opened upward. A suction port (34) allowing the inside of the opening (44) and the outermost end of the compression chamber (31) to communicate with each other is formed in the outer edge (43). The suction port (34) is opened at the suction position of the compression chamber (31). The opening (44) of the outer edge (43) is connected to the above-described suction pipe fitting (47).

In the fixed end plate (41) of the fixed scroll (40), a discharge port (32) is provided near the center of the fixed lap (42) to vertically run through the fixed end plate (41). The lower end of the discharge port (32) is opened at the discharge position of the compression chamber (31). The upper end of the discharge port (32) is opened in a discharge chamber (46) defined in an upper portion of the fixed scroll (40). Although not shown, the discharge chamber (46) communicates with the lower space (16) of the casing (11).

The housing (50) has a substantially cylindrical shape. The outer peripheral surface of the housing (50) is shaped so that its upper portion has a larger diameter than its lower portion. The upper portion of this outer peripheral surface is fixed to the inner peripheral surface of the casing (11).

The drive shaft (23) is inserted in the hollow portion of the housing (50). This hollow portion is also shaped so that its upper portion has a larger diameter than its lower portion. The bearing part (53) is provided in the lower portion of the hollow portion. This bearing part (53) rotatably supports the upper end of the main shaft portion (24) of the drive shaft (23). The upper portion of the hollow portion is partitioned by a seal member (55) so as to define a back pressure space (54). The back pressure space (54) faces the back surface of the orbiting scroll (35). The seal member (55) is fitted between the upper surface of the housing (50) and the back surface of the orbiting scroll (35). The boss (38) of the orbiting scroll (35) is located in the back pressure space (54). The boss (38) is engaged with the eccentric portion (25) of the drive shaft (23) projecting from the upper end of the bearing part (53), and the compression mechanism (20) is driven in rotation by the drive shaft (23).

A first lubrication portion (71) is formed in the eccentric portion (25). As illustrated in FIG. 2, the first lubrication portion (71) is comprised of a first oil supply hole (71a), a first chamfered portion (71b), and a first oil discharge passage (71c).

Specifically, the first oil supply hole (71a) communicating with the oil supply passage (27) of the drive shaft (23) is opened through an outer peripheral surface of the eccentric portion (25). Oil is supplied from the first oil supply hole (71a) to a tiny gap between a first sliding bearing (29a) to be described later and the eccentric portion (25). The oil supplied to the gap flows into the back pressure space (54) as well. Accordingly, the back pressure space (54) comes to have as high pressure as the lower space (16) of the casing (11). Then, the pressure in the back pressure space (54) is applied to the back surface of the orbiting scroll (35) to press the orbiting scroll (35) against the fixed scroll (40).

The first sliding bearing (29a) that rotatably supports the eccentric portion (25) of the drive shaft (23) is fitted into the boss (38). The first oil supply hole (71a) is configured to supply oil to the bearing surface between the eccentric portion (25) of the drive shaft (23) and the first sliding bearing (29a).

FIG. 2A is an enlarged perspective view of the eccentric portion (25). FIG. 2B is a plan view of the eccentric portion (25). FIG. 2C is an enlarged cross-sectional view taken along the plane C-C in FIG. 2B. FIG. 2D is an enlarged view of an upper end portion of the eccentric portion (25). As illustrated in these drawings, the first chamfered portion (71b) gradually expanding from an opening edge of the first oil supply hole (71a) is formed on the eccentric portion (25) of the drive shaft (23). The arrow drawn along the edge of the shaft in FIG. 2A indicates the rotation direction of the drive shaft (23).

In the eccentric portion (25) of the drive shaft (23), the first oil discharge passage (71c) communicating with the first oil supply hole (71a) is formed by a flat surface or a recessed surface at a portion of the outer peripheral surface of the drive shaft (23) into. The first oil discharge passage (71c) extends upward from the first oil supply hole (71a), and has an end portion that is opened to a space wider than the first oil discharge passage (71c). The first oil discharge passage (71c) is formed to have a width that is less than or equal to the diameter of the first oil supply hole (71a). In this embodiment, the first chamfered portion (71b) also forms part of the first oil supply hole (71a), and thus the width is also less than or equal to the maximum external dimension of the first chamfered portion (71b). A trailing edge of the first oil discharge passage (71c) is displaced behind a trailing edge of the first chamfered portion (71b) with respect to the rotation direction of the drive shaft (23). The respective trailing edges of the oil discharge passage (71c) and the first chamfered portion (71b) are both located with respect to the rotation direction of the drive shaft (23). The first oil discharge passage) is formed such that a line segment (a center line) connecting together an end portion (a first end portion) located closer to the first oil supply hole (71a) and an end portion (a second end portion located opposite to the first end portion) from which oil is discharged is parallel to the axial direction of the drive shaft (23).

Figure 3A:
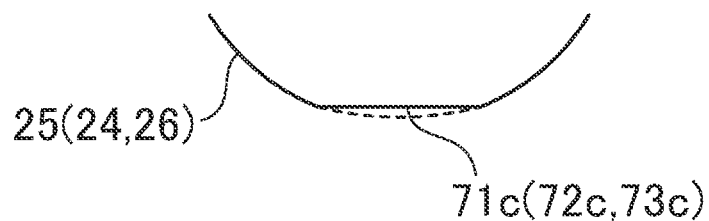
FIG. 3A is a cross-sectional view showing an example in which a first oil discharge passage is configured as a flat surface.
Figure 3B:
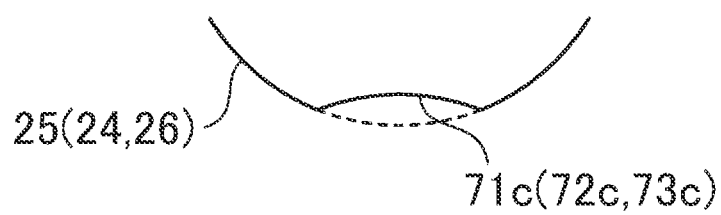
FIG. 3B is a cross-sectional view showing an example in which a first oil discharge passage is configured as a curved, recessed surface.
Figure 3C:
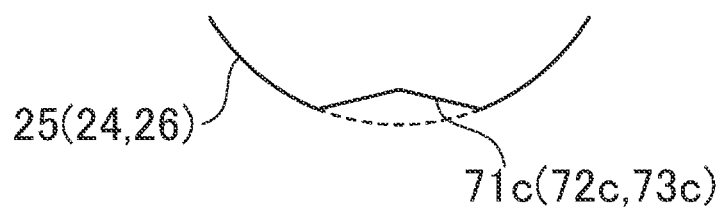
FIG. 3C is a cross-sectional view showing an example in which a first oil discharge passage is configured as a bent, recessed surface.
Figure 3D:
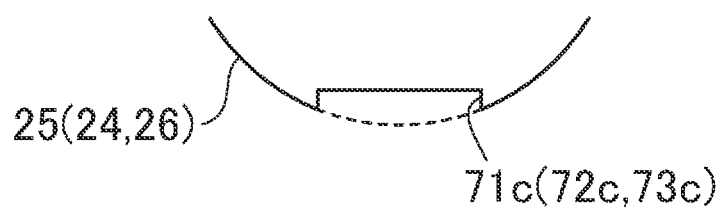
FIG. 3D is a cross-sectional view showing an example in which a first oil discharge passage is configured as a recessed groove.

In the first oil discharge passage (71c), the first end portion located closer to the first oil supply hole (71a) extends beyond the first oil supply hole (71a) in the opposite direction that goes away from the second end portion, from which oil is discharged. The first oil discharge passage (71c) does not have to have a flat surface. FIG. 3A illustrates an example in which the first oil discharge passage (71c) is configured as a flat surface. Alternatively, the first oil discharge passage (71c) may also be configured as a curved, recessed surface as illustrated in FIG. 3B. Still alternatively, the first oil discharge passage (71c) may also be configured as a bent, recessed surface as illustrated in FIG. 3C. Still further alternatively, the first oil discharge passage (71c) may also be configured as a recessed groove as illustrated in FIG. 3D.

Also, in FIG. 2, a second lubrication portion (72) and a third lubrication portion (73) to be described later are shown by the reference numerals in parentheses.

A second sliding bearing (29b) that rotatably supports the main shaft portion (24) of the drive shaft (23) is fitted into the bearing part (53). In the main shaft portion (24), the second lubrication portion (72) is formed. The second lubrication portion (72) is comprised of a second oil supply hole (72a), a second chamfered portion (72b), and a second oil discharge passage (72c).

Specifically, the second oil supply hole (72a) that is opened through the outer peripheral surface of the main shaft portion (24) of the drive shaft (23) is cut through the drive shaft (23) so as to supply oil to the bearing surface between the main shaft portion (24) of the drive shaft (23) and the second sliding bearing (29b). In the main shaft portion (24), formed are the second chamfered portion (72b) gradually expanding from an opening edge of the second oil supply hole (72a), and the second oil discharge passage (72c) communicating with the second chamfered portion (72b) through an edge thereof vertically downward on the paper such that the width of the passage (72c) is at most equal to the maximum external dimension of the second chamfered portion (72b). The second oil discharge passage (72c) extends upward from the second oil supply hole (72a), and has an end portion that is opened to a space wider than the second oil discharge passage (72c). The second chamfered portion (72b) and the second oil discharge passage (72c) have substantially the same configurations as the first chamfered portion (71b) and the first oil discharge passage (71c) provided for the eccentric portion (23).

Figure 4:
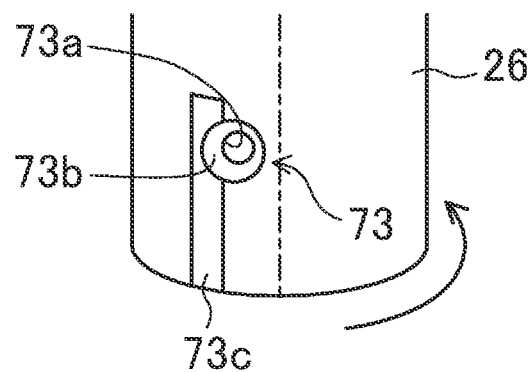
FIG. 4 is an enlarged perspective view of a lower main shaft portion.

A third sliding bearing (29c) that rotatably supports the lower main shaft portion (26) of the drive shaft (23) is fitted into the lower bearing part (28). In the lower main shaft portion (26), the third lubrication portion (73) is formed. As illustrated in FIG. 4, the third lubrication portion (73) is comprised of a third oil supply hole (73a), a third chamfered portion (73b), and a third oil discharge passage (73c). The arrow in FIG. 4 indicates the rotation direction of the lower main shaft portion (26). Although these elements (73a, 73b, 73c) of the third lubrication portion (73) are arranged by turning the associated elements of the first lubrication portion (71) and the second lubrication portion (72) upside down, they are also shown in FIG. 2 for reference by the reference numerals in parentheses.

Specifically, the third oil supply hole (73a) that is opened through an outer peripheral surface of the lower main shaft portion (26) of the drive shaft (23) is cut through the drive shaft (23) so as to supply oil to the bearing surface between the lower main shaft portion (26) of the drive shaft (23) and the third sliding bearing (29c). In the lower main shaft portion (26), formed are the third chamfered portion (73b) gradually expanding from an opening edge of the third oil supply hole (73a), and the third oil discharge passage (73c) communicating with the third chamfered portion (73b) through an edge thereof vertically downward on the paper such that the width of the passage (73c) is at most equal to the maximum external dimension of the third chamfered portion (73b). The third oil discharge passage (73c) extends downward from the third oil supply hole (73a), and has an end portion that is opened to a space wider than the third oil discharge passage (73c). The third chamfered portion (73b) and the third oil discharge passage (73c) have substantially the same configurations as those of the first and second chamfered portions (71b, 72b) and the first and second oil discharge passages (71c, 72c) provided for the eccentric portion (23) and the main shaft portion (24). Thus, a trailing edge (71Tc, 72Tc, 73Tc) of the oil discharge passage (71c, 72c, 73c) is displaced behind a trailing edge (71Ta, 72Ta, 73Ta) of the oil supply hole (71a, 72a, 73a) with respect to a rotation direction of the drive shaft (23), and a leading edge (71Lc, 72Lc, 73Lc) of the oil discharge passage (71c, 72c, 73c) is displaced behind a leading edge (71La, 72La, 73La) of the oil supply hole (71a, 72a, 73a) with respect to a rotation direction of the drive shaft (23). The respective trailing edges of the oil discharge passage (71c, 72c, 73c) and the oil supply hole (71a, 72a, 73a) are both located with respect to the rotation direction of the drive shaft (23). The respective leading edges of the oil discharge passage (71c, 72c, 73c) and the oil supply hole (71a, 72a, 73a) are both located with respect to the rotation direction of the drive shaft (23).

—Operation—

Next, operation of the above-described scroll compressor (10) will be described. When the motor (21) of the scroll compressor (10) is powered on, the rotor (21b) and the drive shaft (23) start to rotate. Then, the orbiting scroll (35) starts to revolve. As the orbiting scroll (35) revolves, the volume of the compression chamber (31) increases and decreases periodically and alternately.

Specifically, when the drive shaft (23) rotates, a refrigerant is sucked from the suction port (34) into the compression chamber (31). Then, as the drive shaft (23) rotates, the compression chamber (31) is completely closed. As the drive shaft (23) further rotates, the volume of the compression chamber (31) starts decreasing, thus starting compressing the refrigerant in the compression chamber (31).

Thereafter, the volume of the compression chamber (31) further decreases. When the volume of the compression chamber (31) decreases to a predetermined volume, the discharge port (32) opens. The refrigerant compressed in the compression chamber (31) is discharged to the discharge chamber (46) of the fixed scroll (40) through the discharge port (32). The refrigerant in the discharge chamber (46) is discharged from the discharge pipe (19) through the lower space (16) of the casing (11). As described above, the lower space (16) communicates with the back pressure space (54), and the pressure of the refrigerant in the back pressure space (54) causes the orbiting scroll (35) to be pressed against the fixed scroll (40).

Next, the oil supply operation of the scroll compressor (10) will be described. When the compression mechanism (30) starts, oil in the oil reservoir portion (17) is sucked from the inlet (61a) of the suction nozzle (60) by positive displacement pump action. The oil sucked from the suction nozzle (60) flows through the oil supply passage (27) of the drive shaft (23), and is supplied to sliding portions such as thrust sliding surfaces between the orbiting scroll (35) and the fixed scroll (40), sliding surfaces between the first sliding bearing (29a) of the boss (38) and the eccentric portion (25), sliding surfaces between the second sliding bearing (29b) of the bearing part (53) of the housing (50) and the main shaft portion (24), and sliding surfaces between the third sliding bearing (29c) of the lower bearing part (28) and the lower main shaft portion (26).

In each of these sliding portions (the bearing surfaces), oil is discharged out of the sliding portion from the oil supply hole (71a, 72a, 73a) through the chamfered portion (71b, 72b, 73b) and the oil discharge passage (71c, 72c, 73c) discharged oil is collected in the oil reservoir portion (17).

Advantages of Embodiments

According to this embodiment, the oil discharge passage (71c, 72c, 73c) is arranged behind the oil supply hole (71a, 72a, 73a) with respect to the rotation direction of the drive shaft (23). Thus, even if a foreign substance such as a metal powder enters the oil supply hole (71a, 72a, 73a), the foreign substance moves to the oil discharge passage (71c, 72c, 73c), and is discharged out of the bearing surface from the oil discharge passage (71c, 72c, 73c).

In this case, the foreign substance is discharged not only in the direction in which it moves from the oil discharge passage (71c, 72c, 73c) in the axial direction of the drive shaft (23) but also in the direction in which it is going to pass through the clearance between the oil discharge passage (71c, 72c, 73c) and the bearing (29a, 29b, 29c) from the trailing edge of the oil discharge passage (71c, 72c, 73c) with respect to the rotation direction. Consequently, the foreign substance is hardly accumulated in the oil supply hole (71a, 72a, 73a), and thus damage to be done to the bearing (29a, 29b, 29c) is reduced.

In addition, the end portion (the second end portion) of the oil discharge passage (71c, 72c, 73c) is opened to the space wider than the oil discharge passage (71c, 72c, 73c). Accordingly, the oil is discharged more easily from the oil supply hole (71a, 72a, 73a) through the oil discharge passage (71c, 72c, 73c), and thus a foreign substance and other substances are discharged more easily, too.

Furthermore, the chamfered portion (71b, 72b, 73b) is provided for the opening edge of the oil supply hole (71a, 72a, 73a) so that a foreign substance is hardly accumulated in the oil supply hole (71a, 72a, 73a). Thus, damage to be done to the bearing (29a, 29b, 29c) is more reliably reduced.

Moreover, the trailing edge of the oil discharge passage (71c, 72c, 73c) in the rotation direction is so long that a foreign substance is easily discharged from the trailing edge through the clearance. Thus, damage to be done to the bearing surface is more reliably reduced.

Variations of Embodiments

First Variation

Figure 5A:
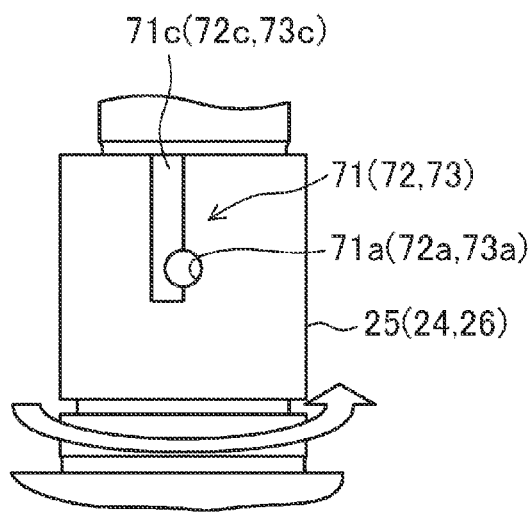
FIG. 5A is a perspective view showing a variation in which an oil supply hole with no chamfered portion is provided.

In the embodiment described above, the chamfered portion (71b, 72b, 73b) is formed at the opening edge of the oil supply hole (71a, 72a, 73a). As illustrated in FIG. 5A, however, the chamfered portion (71b, 72b, 73b) does not have to be formed. Even if no chamfered portion (71b, 72b, 73b) is provided, a foreign substance in the oil supply hole (71a, 72a, 73a) is still discharged through the oil discharge passage (71c, 72c, 73c). Thus, damage to be done to the bearing is still reduced effectively enough. The arrow in FIG. 5A indicates the rotation direction of the drive shaft (25).

Second Variation

Figure 5B:
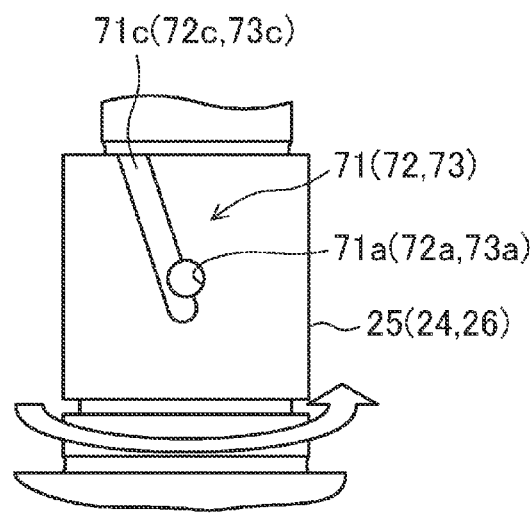
FIGS. 5B, 5C, and 5D are perspective views each showing a variation of the oil discharge passage.
Figure 5C:
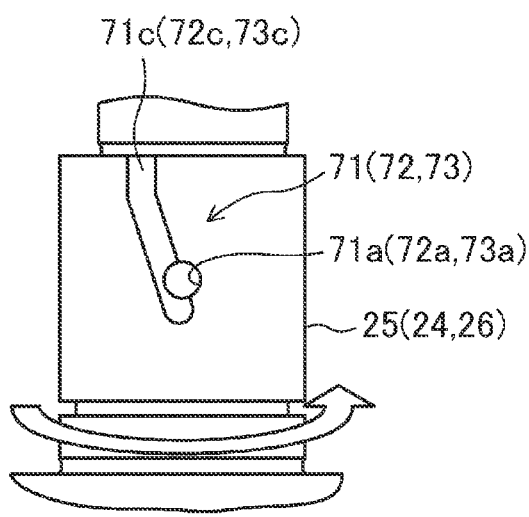
Figure 5D:
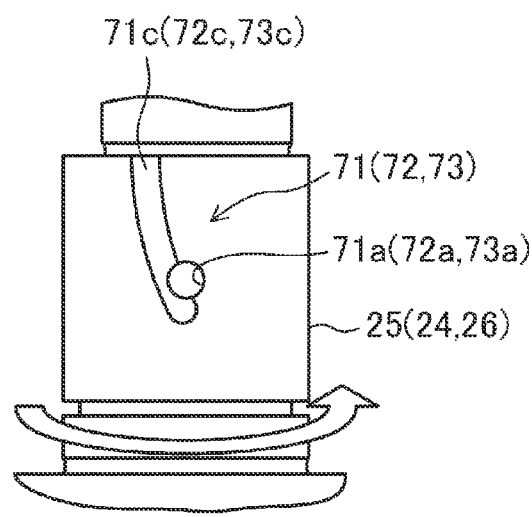
Figure 6A:
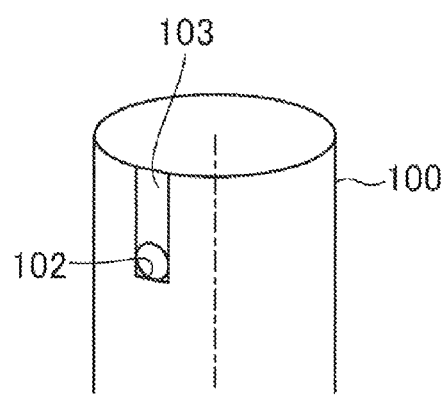
FIG. 6A is a perspective view showing an oil supply hole and an oil discharge passage according to a prior art example.
Figure 6B:
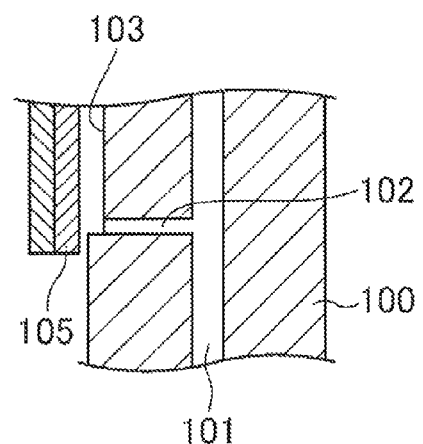
FIG. 6B is a longitudinal sectional view thereof.
Figure 6C:
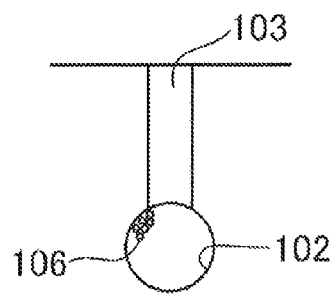
FIG. 6C is a front view showing an oil discharge passage having a narrower width according to a prior art example.

In the embodiments shown in FIGS. 1 to 4, the oil discharge passage (71c, 72c, 73c) is formed so that the line segment (the center line) that connects together the oil supply hole (71a, 72a, 73a) and the end portion of the oil discharge passage (71c, 72c, 73c), from which oil is discharged, is parallel to the axial direction of the drive shaft (23). However, the oil discharge passage (71c, 72c, 73c) also be formed as illustrated in FIGS. 5B, 5C, and 5D. The arrows in the FIGS. 5B, 5C, and 5D indicate the rotation direction of the drive shaft (23).

In the examples shown in FIGS. 5B, 5C, and 5D, the oil discharge passage (71c, 72c, 73c) is formed so that the line segment (the center line) that connects together the oil supply hole (71a, 72a, 73a) and the end portion from which oil is discharged is tilted with respect to the axial direction of the drive shaft (23). Also, the end portion of the oil discharge passage (71c, 72c, 73c), from which oil is discharged, is located behind the oil supply hole (71a, 72a, 73a) with respect to the rotation direction of the drive shaft (23). FIG. 5B illustrates an example in which the entire oil discharge passage (71c, 72c, 73c) is formed in a straight line. FIG. 5C illustrates an example in which the oil discharge passage (71c, 72c, 73c) is bent so that only the end portion of the oil discharge passage (71c, 72c, 73c), from which oil is discharged, is parallel to the axial direction of the drive shaft (23). FIG. 5D illustrates an example in which the oil discharge passage (71c, 72c, 73c) is curved so that only the end portion of the oil discharge passage (71c, 72c, 73c), from which oil is discharged, is parallel to the axial direction of the drive shaft (23).

In the examples illustrated in FIGS. 5B, 5C, and 5D, the chamfered portion may be omitted.

If the oil discharge passage (71c, 72c, 73c) is tilted in the opposite direction to the rotation direction, a foreign substance is hardly left. Accordingly, the damage to be done to the bearing surface is more reliably reduced.

Other Embodiments

The embodiment described above may also be modified to have any of the following configurations.

In the embodiment described above, the present invention is supposed to be applied to a scroll compressor. However, the present invention may also be applied to a sliding portion of a rotting piston compressor or a swing piston compressor.

In addition, the configurations of the oil supply hole (71a, 72a, 73a) and the oil discharge passage (71c, 72c, 73c) mentioned in the foregoing description of embodiments or variations are just examples. As long as the oil discharge passage (71c, 72c, 73c) having a width narrower than the diameter of the oil supply hole (71a, 72a, 73a) is displaced behind the oil supply hole (71a, 72a, 73a) with respect to the rotation direction of the drive shaft (23) so as to communicate with the oil supply hole (71a, 72a, 73a), the other specific configurations of the embodiments and variations described above may be modified.

Furthermore, in the embodiment shown in FIGS. 1 and 2, the first oil supply hole (71a) and the first oil discharge passage (71c) are formed in the eccentric portion (25), the second oil supply hole (72a) and the second oil discharge passage (72c) are formed in the main shaft portion (24), and the third oil supply hole (73a) and the third oil discharge passage (73c) are formed in the lower main shaft portion (26). However, the first oil supply hole (71a) may be omitted from the eccentric portion (25). In that case, in the eccentric portion (25), only the first oil discharge passage (71c) is formed as a groove that supplies oil to the sliding surface of the bearing (29b), and a foreign substance and other substances are discharged through the first oil discharge passage (71c).

The embodiments described above are merely examples in nature, and not intended to limit the scopes of the present invention, application thereof, and usage thereof.

INDUSTRIAL APPLICABILITY

As can be seen from the foregoing, the present invention is useful for a compressor including a compression mechanism and a drive shaft configured to drive the compression mechanism and having an oil supply hole which is opened through its outer peripheral surface to supply oil to its own bearing surface.

What is claimed is:

1. A compressor comprising:
a compression mechanism; and
a drive shaft arranged and configured to drive the compression mechanism, the drive shaft having an oil supply hole opened through an outer peripheral surface of the drive shaft to supply oil to a bearing surface of the drive shaft,
an oil discharge passage communicating with the oil supply hole being formed by a flat surface or a recessed surface at a portion of the outer peripheral surface of the drive shaft,
a trailing edge of the oil discharge passage being displaced behind a trailing edge of the oil supply hole with respect to a rotation direction of the drive shaft, the trailing edges of the oil discharge passage and the oil supply hole being both located with respect to the rotation direction of the drive shaft,
a leading edge of the oil discharge passage being displaced behind a leading edge of the oil supply hole with respect to the rotation direction of the drive shaft, the leading edges of the oil discharge passage and the oil supply hole being both located with respect to the rotation direction of the drive shaft, and
the oil discharge passage being formed to have a width that is less than or equal to a diameter of the oil supply hole.

2. The compressor of claim 1, wherein
the oil discharge passage includes a first end portion located closer to the oil supply hole and a second end portion located opposite to the first end portion and from which oil is discharged, and
a line segment connecting the first and second end portions together is parallel to an axial direction of the drive shaft.

3. The compressor of claim 2, wherein
the first end portion of the oil discharge passage, which is located closer to the oil supply hole, extends beyond the oil supply hole in an opposite direction that goes away from the second end portion from which the oil is discharged.

4. The compressor of claim 3, wherein
the drive shaft is provided with a chamfered portion gradually expanding from an opening edge of the oil supply hole.

5. The compressor of claim 4, wherein
the trailing edge of the oil discharge passage is displaced behind a trailing edge of the chamfered portion with respect to the rotation direction of the drive shaft, the trailing edges of the oil discharge passage and the chamfered portion being both located with respect to the rotation direction of the drive shaft.

6. The compressor of claim 2, wherein
the drive shaft is provided with a chamfered portion gradually expanding from an opening edge of the oil supply hole.

7. The compressor of claim 6, wherein
the trailing edge of the oil discharge passage is displaced behind a trailing edge of the chamfered portion with respect to the rotation direction of the drive shaft, the trailing edges of the oil discharge passage and the chamfered portion being both located with respect to the rotation direction of the drive shaft.

8. The compressor of claim 1, wherein
the oil discharge passage includes a first end portion located closer to the oil supply hole and a second end portion which is located opposite to the first end portion and from which oil is discharged, and
the oil discharge passage is tilted with respect to the axial direction of the drive shaft and the second end portion is located behind the first end portion with respect to the rotation direction of the drive shaft.

9. The compressor of claim 8, wherein
the first end portion of the oil discharge passage, which is located closer to the oil supply hole, extends beyond the oil supply hole in an opposite direction that goes away from the second end portion from which the oil is discharged.

10. The compressor of claim 8, wherein
the drive shaft is provided with a chamfered portion gradually expanding from an opening edge of the oil supply hole.

11. The compressor of claim 10, wherein
the trailing edge of the oil discharge passage is displaced behind a trailing edge of the chamfered portion with respect to the rotation direction of the drive shaft, the trailing edges of the oil discharge passage and the chamfered portion being both located with respect to the rotation direction of the drive shaft.

12. The compressor of claim 1, wherein
the drive shaft is provided with a chamfered portion gradually expanding from an opening edge of the oil supply hole.

13. The compressor of claim 12, wherein
the trailing edge of the oil discharge passage is displaced behind a trailing edge of the chamfered portion with respect to the rotation direction of the drive shaft, the trailing edges of the oil discharge passage and the chamfered portion being both located with respect to the rotation direction of the drive shaft.

14. The compressor of claim 1, wherein
the drive shaft extends vertically, and includes
- a main shaft portion located in a middle of the shaft,
- an eccentric portion located over the main shaft portion, coupled to the compression mechanism, and having a smaller diameter than the main shaft portion, and
- a lower main shaft portion located under the main shaft portion, the oil supply hole includes a first oil supply hole formed in the eccentric portion, and
the oil discharge passage includes a first oil discharge passage extending upward from the first oil supply hole and having an open end portion.

15. The compressor of claim 1, wherein
the drive shaft extends vertically, and includes
- a main shaft portion located in a middle of the shaft,
- an eccentric portion located over the main shaft portion, coupled to the compression mechanism, and having a smaller diameter than the main shaft portion, and
- a lower main shaft portion located under the main shaft portion, the oil supply hole includes a second oil supply hole formed in the main shaft portion, and
the oil discharge passage includes a second oil discharge passage extending upward from the second oil supply hole and having an open end portion.

16. The compressor of claim 1, wherein
the drive shaft extends vertically, and includes
- a main shaft portion located in a middle of the shaft,
- an eccentric portion located over the main shaft portion, coupled to the compression mechanism, and having a smaller diameter than the main shaft portion, and
- a lower main shaft portion located under the main shaft portion, the oil supply hole includes a third oil supply hole formed in the lower main shaft portion, and
the oil discharge passage includes a third oil discharge passage extending downward from the third oil supply hole and having an open end portion.

* * * * *